Patented Apr. 30, 1940

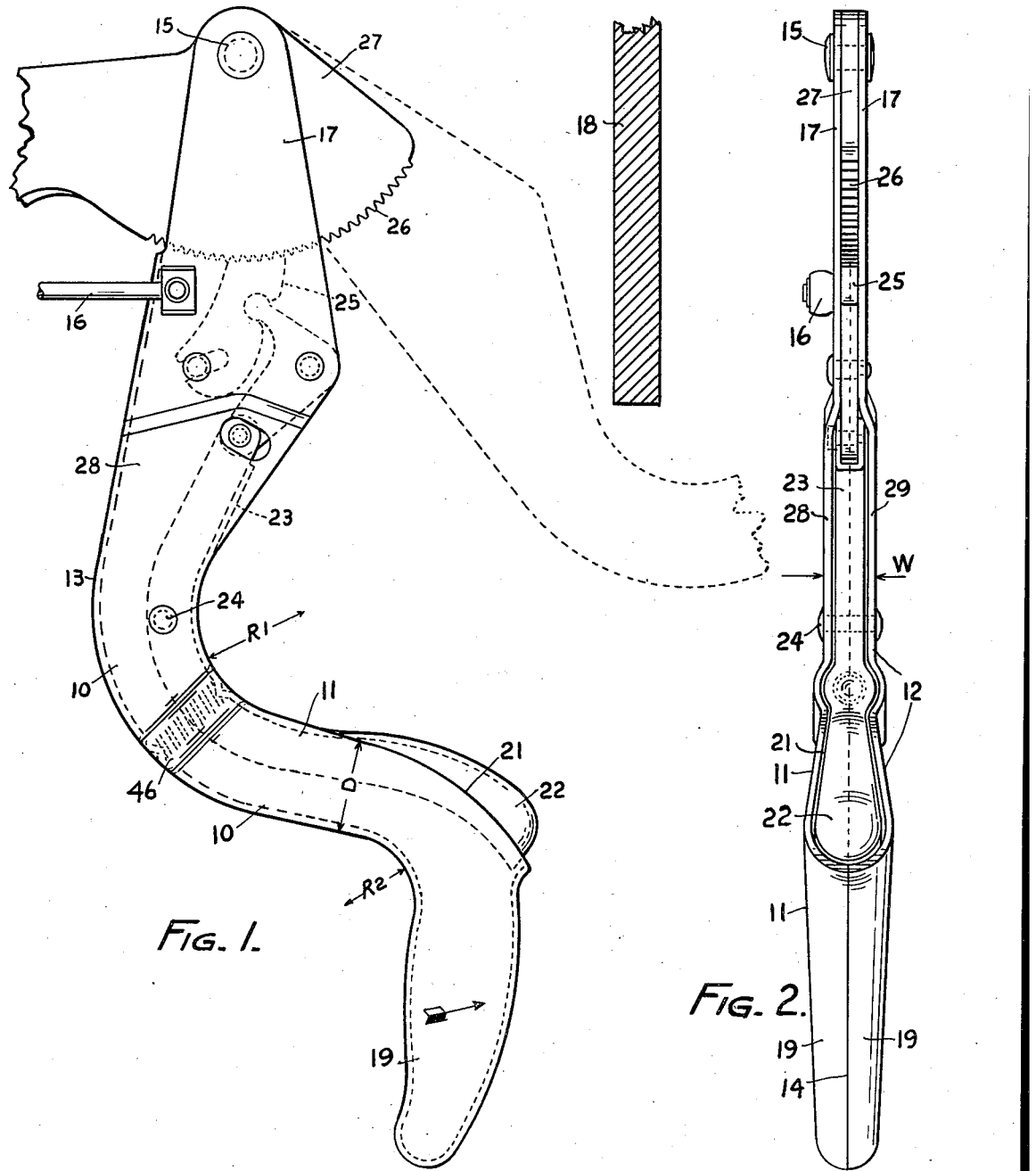

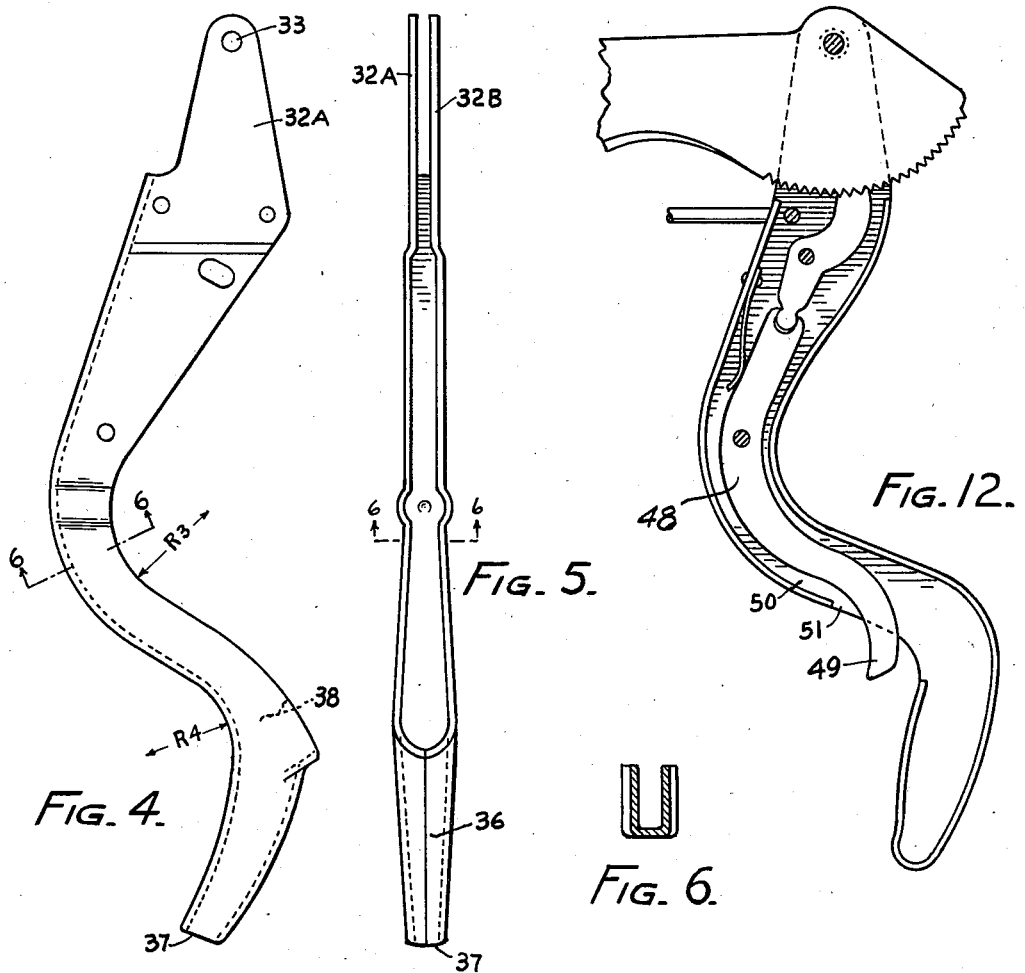

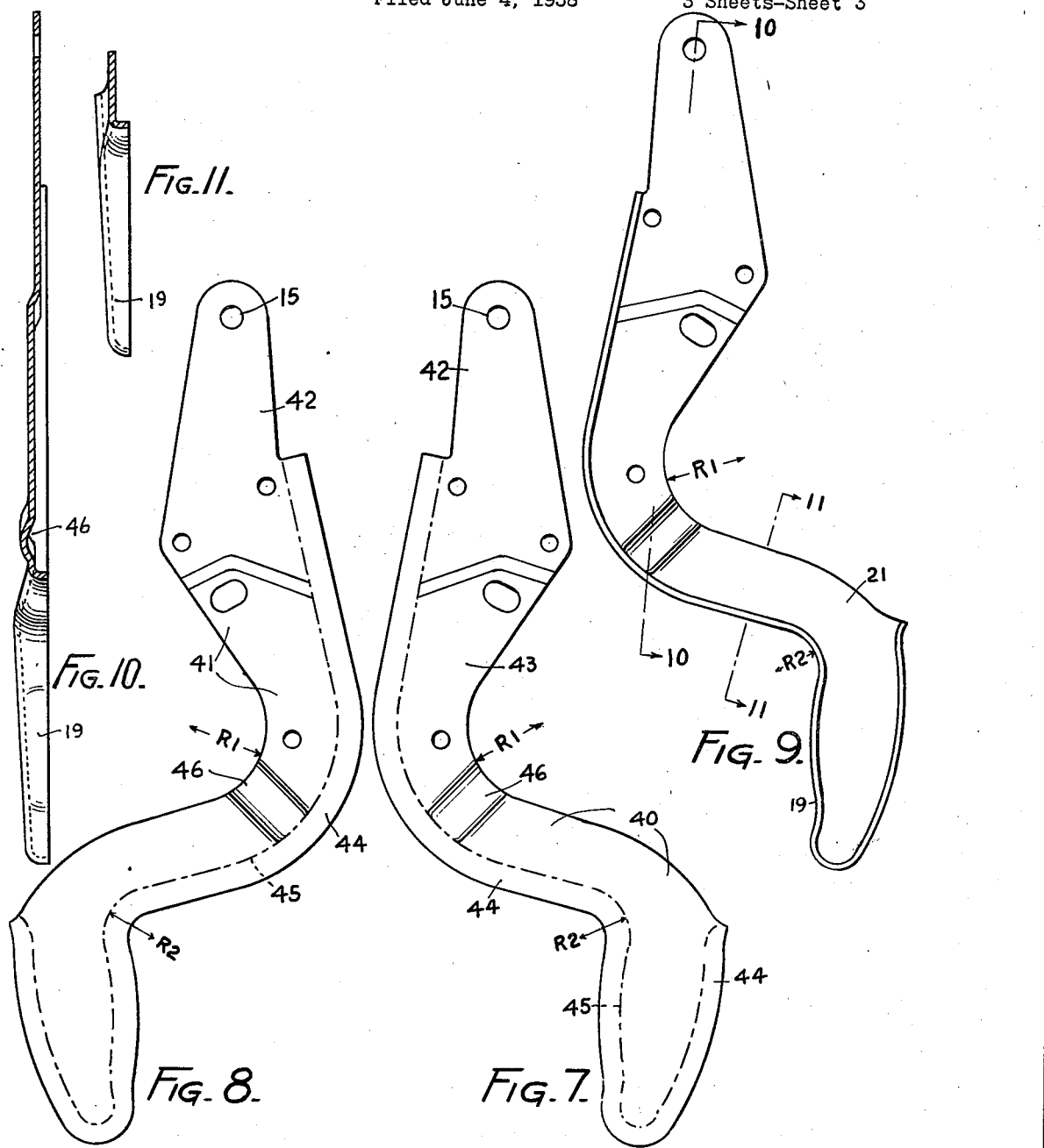

2,199,366

UNITED STATES PATENT OFFICE 2,199,366

METHOD FOR MAKING BRAKE LEVERS

Floyd D. Wenn, Binghamton, N. Y., assignor to The Brewer-Titchener Corporation, Cortland, N. Y., a corporation of New York Application June 4, 1938, Serial No. 211,893

2 Claims. (Cl. 29—152)

This invention broadly relates to the art of separately forming and then uniting brake lever sections made from sheet metal blanks, and more particularly pertains to an improved method by which to fabricate a light weight automotive emergency brake lever or the like vehicle controls of which the elongated shank needs to be given a sharply crooked contour that may be economically and flawlessly struck up by the use of a rapid stamping press without excessive metal stretch or flange fracture into registering counterparts adapted to be welded together. By virtue of my refined processing there is attained a more reliable lever product free from latent defects and in which the rejects may be reduced to nominal proportions although the lever shank is abruptly kinked longitudinally.

The instant tubular type of lever is more especially intended for use as a depending hand brake control suspended upon a main fulcrum located closely behind the instrument panel in accordance with more recent automotive practice. My pivoted lever shank provides for an acutely crooked S-shaped contour of which one kink region is adapted to snugly clear the lower edge of said panel when the lever is swung rearwardly into its set brake rod position. The companion kink may be reversely crooked to provide for a comfortable pistol-like grip portion by which to tightly apply the brake rod without appreciable finger slippage. The same underlying principle of manufacture also finds application to analogous products.

The object of the present invention is to devise an improved method for fabricating a brake lever or the like machine element of the character indicated that initially comprises separately formed sheet metal counterparts adapted to be welded together into a unitary tubular structure and which acutely crooked lever may be flawlessly processed on a rapid productive scale without metal tear or other abnormal internal forming stress.

Reference is had to the accompanying three sheets of drawings which are illustrative of certain alternative disclosures, and in which:

Fig. 1 is an elevational side view of an assembled brake lever embodying my improved product, and Fig. 2 is an edge view thereof.

Fig. 3 shows a conventional sheet metal blank commonly resorted to in fabricating non-sectionalized brake levers.

Figs. 4 and 5 respectively depict a side view and an edge view of the completed Fig. 3 lever blank, Fig. 6 being a cross-sectional view taken along 6—6 of Fig. 5.

Figs. 7 and 8 respectively represent a right-hand and a left-hand sheet metal blank used in my improved process for making sectionalized brake levers.

Fig. 9 presents such left-hand blank having certain of its edge portions upturned to constitute a shank section ready to be welded to a corresponding right-hand counterpart.

Figs. 10 and 11 respectively detail structural aspects taken along line 10—10 and line 11—11 of Fig. 9.

Fig. 12 is illustrative of a modified style of my sectionalized brake lever equipped with a different type of pawl actuating release lever.

Referring first to the product that results from my improved mode of fabrication, Figs. 1 and 2 disclose an assembly of one tubular embodiment thereof as directed to an automotive hand brake lever. In this sectionalized primary lever 10, the component shank sections or counterparts 11 and 12 are initially stamped separately by power driven die means to respectively include a flange whose border is preferably given an acute L-shaped or doubly crooked S-shaped configuration and which borders are respectively provided with an upturned registering web forming component 13 whose abutting edges when superimposed, may be welded along a longitudinal seam such as 14.

In modern cars, the main fulcrum 15 of said hand brake lever is now generally being located to the left of the seated driver and the crooked shank edge arranged to swing rearwardly toward the driver when applying tension to the brake rod 16. An outstanding characteristic of my improved primary lever resides in the permissible sharply kinked contour of its component flange borders. The forked suspended lever end 17 may be upheld by a main pivot as disposed closely behind the stationary instrument panel 18, as shown. Such crooked shank may safely be abruptly kinked to conform with a relatively small upper fillet or radius of curvature R1 shaped to snugly clear the lower panel edge when the lever is applied, thus making for a compact and neatly trimmed brake control installation. The depending lever end region is reversely kinked to conform with a small lower fillet or radius of curvature R2 and which lever end preferably terminates in the welded so-called pistol grip 19. An obliquely disposed medial flange portion serves to interconnect such axially offset lever ends and said radii tangentially fillet the respective intersecting borders thereof.

In the Fig. 1 type of lever, the assembled rearward shank edge facing the driver may provide an elongated slot 21 for the reception of a depressible thumb piece 22 carried by a spring actuated release lever 23. The latter lever is shown pivoted intermediate its ends at 24 and mounted between the relatively flat lever side flanges 28 and 29. The other trip lever end may be linked in any suitable manner to actuate a pawl 25 which in turn, may engage the stationary ratchet teeth 26 of the arcuate rack 27 in a conventional manner. As will be understood, the engaged pawl is intended to be released by depressing the thumb piece 22.

The radius of curvature R2 is purposely kept sufficiently small to allow the forefinger to be comfortably nested therein whereby to keep the hand from slipping upwardly toward the main fulcrum 15 while exerting a heavy pull upon the lever grip 19. The problem herein solved primarily has to do with an assured sound fabrication of a singly or doubly crooked tubular lever when shaped to provide for a pronounced radius of curvature. It will be observed that in such standardized light weight automative levers, the web width or lateral spacing W between the assembled flat side flanges is generally kept comparatively narrow relative to the mean flange depth designated D, such relationship being a prerequisite for adequate strength and stiffness against the anticipated ultimate grip pull.

As distinguished from the edgewise kinking of such flat flanges in the conventional manner, advantage is herein taken of the cited flange and web proportions. By resorting to separate sheet metal blanks whose respective marginal regions are upturned transversely relative to a corresponding potential flange face, the mated counterparts 11 and 12 may readily be formed up by die press means without abnormal wastage in stamped material or setting up high internal forming stress in my lever components. Hence, my radius R2 in particular may be given a length that is kept smaller than the flange width D without tendency to tear along a stretched flange edge.

In order to more clearly explain the fabrication difficulties heretofore encountered in stamping sharply crooked brake levers from a unitary blank, reference is had to Figs. 3 to 6 inclusive which delineate common practice. Fig. 3 represents a conventional sheared blank 31 having a pair of integral forked ends 32A and 32B that may each be provided with an initially pierced fulcrum aperture such as 33. The opposite blank end 35 is ultimately shaped into a tubular grip portion.

By another die operation, such blank may be given a longitudinally offset profile (not detailed) and simultaneously have the potential seam edges 36 of said grip portion partially curled inwardly. A subsequent treatment usually consists in a stepwise breakdown of such offset profile to throw up its opposed flange edges into a V-shape taken crosswise of the longitudinal center line X—X. By a further similar step, the flanges are finally brought into an integrally connected U-shape of the form depicted in Figs. 4 to 6. The seam edges 36 are thereupon closed to leave an opening 37 at the tip of said grip. If required, said tip opening might be crimped shut by a separate step but this is usually dispensed with because of the difficulty and extra cost involved.

Such integrally bent lever flanges call for the use of highest grade low carbon, sheet steel stock. In practice, the radii such as R3 or R4 of Fig. 4 have been found to be inherently limited in attaining a desired sharply crooked curvature because the required metal flow becomes extremely severe when acutely kinking the flanges edgewise. The free outermost flange edge in the R4 region of such conventional lever usually becomes materially reduced over its original blank thickness. As a result, this highly stretched edge is likely to rend and be otherwise ruptured in the marginal flange region indicated as 38, all of which may bring about a considerable wastage in partially completed or in unacceptable brake lever shanks. For instance, when the curvature radius R4 of Fig. 4 is reduced to a relatively small dimension in automotive hand brake levers of customary flange depth, the accompanying wastage by defective product and rejects is apt to become abnormally large.

Regarding the use of a correspondingly small radius of curvature R3, this in conventional practice is less likely to result in pronounced lever wastage for the reason that its compressed flange edge would show a marked tendency to buckle rather than tear, a defect however that makes for a rough flange exterior and may lead to severe scoring of the dies.

The present market trend and demand is for safer and more sharply crooked levers than is afforded by the cited conventional processing. As intimated in connection with Figs. 1 and 2, my improved method contemplates a procedure which obviates bending the lever flange edgewise whereby to correct for flange rupture or buckling and to generally afford a more reliable product that shall be free from latent defects difficult to detect by close visual inspection. This goal may readily be achieved by the use of mated right-hand and left-hand blanks such as 40 and 41 (see Figs. 7 and 8) adapted to be formed into corresponding counterparts of the kind disclosed in Figs. 9 to 11. Such flat sheet metal blanks may initially be cut to make up any desired shank perimetric curvature without being inherently limited by flange tear.

Each such elongated blank section may be sheared to provide for a single apertured fork forming portion 42 at one blank end region and a grip forming portion at the opposite end region thereof that may be axially offset with respect to each other and interconnected by an oblique medial flange forming portion. The opposed border components thereof are respectively defined by an acutely crooked radius of curvature R1 and a similar but reversed grip radius R2. The flat flange forming portion 43 may be sheared to embrace an integral brim appendage 44. No edge region of said flange portion is drawn thin by stretching while said appendage is being upturned along the crease line 45 to constitute a shallow potential web component for my sectionalized lever. Furthermore the upstanding edge is placed under compression and thus avoids subjecting said edge to a tearing tendency. Such brim appendage may also extend around the grip to close the tip thereof. A portion of one medial shank edge may be devoid of a brim appendage to afford the open slot or gap 21 extending between the spaced terminals of upturned brim appendages in which to mount the release lever 23 shown in Figs. 1 and 2. Either flange blank may initially be formed with a single laterally offset strap end 42 or a semi-cylindrical spring pocket 46, as shown.

After thus striking up the web forming components, their respective upturned edges if burred, may readily be smoothly trimmed by appropriate dies or by disc grinding means, although this rectification is usually found superfluous.

The registering edges of such right-hand and left-hand counterparts after being superimposed, are welded together, preferably by means of a suitable electric flash welder of adequate capacity. Machines of this kind are equipped to provide for a relatively high initial current intensity whereby any abutting high spots are quickly burned off without need of any preliminary trim and whereupon the current flow is lowered to a sustained welding heat which continuously and permanently unites the registering web components to a specified overall height along opposed seams such as 14. Should any fin or excessive flash be formed, this may be ground off or otherwise trimmed by die means or the like.

The perfected results herein attained are primarily centered in trimming a brimless flange edge to a size and acutely curved kink shape that conforms with the corresponding marginal contour desired in the completed lever and thereby leaving such closely trimmed edge free from severe internal stress likely to be set up when planiform flanges are bent edgewise to impart a cross-sectionally channeled profile to a stamped lever in the Fig. 4 manner.

The welded tubular lever shank is now ready to have a release lever, pawl and other appurtenances assembled therein in the Figs. 1 and 2 manner. In the alternative assembly shown in Fig. 12, the release lever 48 may be modified to provide for a depending trigger element 49. For such arrangement, the forward edge of the primary lever shank 50 may readily be differently apertured at 51 by a corresponding gap disposition of the web forming appendage when applied to appropriate counterpart blanks (not shown), although substantially similar to Figs. 7 and 8. The same method permits the fabrication of hollow shanks without any web or end outlet openings.

To recapitulate, the considerable stamping difficulty inherent in forming an acutely crooked lever out of a single blank, has been emphasized and exemplified. The required die blocks not only become complicated but deep lever flanges when crooked edgewise, tend to tear or wrinkle in the region of any pronounced arcuate curvature. There is herein taught a more direct and perfected stamping procedure including a final welding or other uniting step, which method as practiced on a large scale productive basis, adequately obviates the cited deficiencies on a competitive cost basis without involving inordinate product rejections or the like excessive wastage by defective stampings. If desired, the L-shaped release lever 23 may also be welded in sectionalized counterparts in a manner identical with the described primary lever 10.

As will be understood by those skilled in this art, my improved method also finds application to analogous acutely crooked tubular products of either L or S shaped contour other than emergency brake levers and that detailed changes may be resorted to in likewise carrying out my illustrative embodiments, all without departing from the spirit and scope of my invention heretofore described and more particularly pointed out in the appended claims.

I claim:

1. The method of manufacturing an initially sectionalized automotive brake lever of the emergency type by stamping a pair of cooperating blanks out of sheet metal stock to a similar pattern whose marginal contours respectively embrace a substantially flat S-shaped flange forming portion of which the ends respectively terminate in a fork forming portion and in a pistol grip forming portion having interposed therebetween a sharply kinked blank component provided with opposed arcuate edge regions arranged about a substantially common curvature center, and which method comprises the step of shearing one such opposed edge region together with the grip forming portion to include a web forming brim integrally appended thereto and of shear trimming the other flange edge region to conform with the contour given to the completed lever flange, then reversely upturning the respective brim appendages relative to the flange thereof to constitute counterpart sections, and thereupon superimposing registering edges of such upturned appendages and welding said sections into a hollow unitary brake lever comprising web interconnected flanges of which their aforesaid trimmed other edges are respectively kept substantially free from internal forming stress.

2. The method of manufacturing an initially sectionalized automotive brake lever of the suspended emergency type by stamping a pair of cooperating blanks out of sheet metal stock to a similar pattern whose marginal contours respectively embrace a substantially flat S-shaped flange forming portion of which the ends respectively terminate in a fork forming portion and in a pistol grip forming portion having an interposed sharply kinked flange component provided with opposed arcuate edge regions arranged about a substantially common curvature center at different radii of which the length of the smaller is less than half the greater, and which method comprises the step of shearing one such opposed edge region together with the grip forming portion to include a web forming brim integrally appended thereto and of shear trimming the other flange edge region to conform with the contour given to the completed lever flange, then reversely upturning the respective appended brims relative to the flange thereof to constitute counterpart sections, and thereupon superimposing registering edges of such upturned appendages and welding said sections into a hollow unitary brake lever having web interconnected flanges of which their aforesaid trimmed other edges are respectively kept substantially free from internal forming stress.

FLOYD D. WENN.